E. L. GREEN.
LAMP FOR ROAD VEHICLES.
APPLICATION FILED JAN. 30, 1917.

1,241,368.

Patented Sept. 25, 1917.

UNITED STATES PATENT OFFICE.

EDWARD LYCETT GREEN, OF ASHFIELD, YORK, ENGLAND.

LAMP FOR ROAD-VEHICLES.

1,241,368.  Specification of Letters Patent.  Patented Sept. 25, 1917.

Application filed January 30, 1917. Serial No. 145,552.

*To all whom it may concern:*

Be it known that I, EDWARD LYCETT GREEN, subject of the King of Great Britain, residing at Ashfield, York, in the county of York, England, have invented certain new and useful Improvements in Lamps for Road-Vehicles, and of which the following is a specification.

The object of this invention is to direct and control the light rays proceeding from the head lamps of motor-driven road vehicles, in such manner that the light rays shall be directed forwardly upon the road in the form of a single beam of light from each lamp and shall not be diffused about the car as is usual; and moreover the invention is to provide means for automatically shutting off or regulating the light rays emitted from the lamp when the vehicle is proceeding up hill and for mechanically shutting off the light rays when required, the object of such regulation of the light being primarily to prevent the said light from the lamps serving as a guide or signal to hostile aircraft.

This invention, as illustrated in the accompanying drawings, is carried into effect by providing each lamp with a relatively long horizontal tube, the lens of the lamp being located at the rear end thereof so that the light rays pass through the tube and are projected onto the road through the forward end of the said tube, the normally open forward end of which is controlled as hereafter described.

Figure 2:
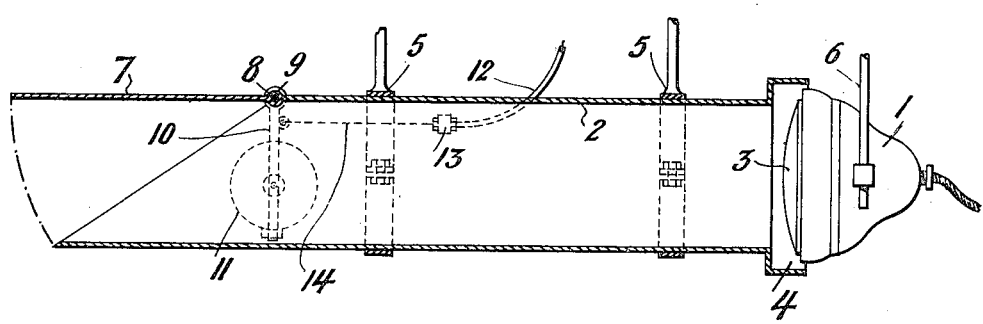
Fig. 2 is a longitudinal vertical section showing the light-directing tube having a lamp at its rear and light-controlling means at its forward end, this view being drawn to a larger scale than the previous figure.

Referring to the drawings, and particularly to Fig. 2, each lamp 1, the light rays from which are directed forwardly of the vehicle, is provided with a relatively long tube 2, the rear open end 4 of which incloses the lens 3 of the lamp 1, while the forward end of the tube 2 is normally open to permit of the exit of the light rays therefrom.

Means are provided by which the tube 2 and the lamp 1 are carried from the body of the vehicle. In the example of construction and arrangement illustrated the pair of lamps 1 with their light-controlling tubes 2 are located with their axes horizontal and parallel to each other beneath the chassis of the vehicle, each tube 2 being supported from the framework of the vehicle by strap brackets 5, and the lamp 1 is suspended also beneath the vehicle by a bracket 6 so that the tube 2 and the lamp 1 are securely held in position with the light rays proceeding from the lamp passing into and through the tube 2.

The rear end 4 of the tube 2 is provided, in the construction shown, with a flanged enlarged rear end within which the front of the lamp 1 enters.

With this apparatus the light rays so shielded and directed by the tube 2 are projected in a forward direction in the form of a single beam of light onto the road in front of the vehicle, and are not diffused to any great extent as is common.

Figure 1:
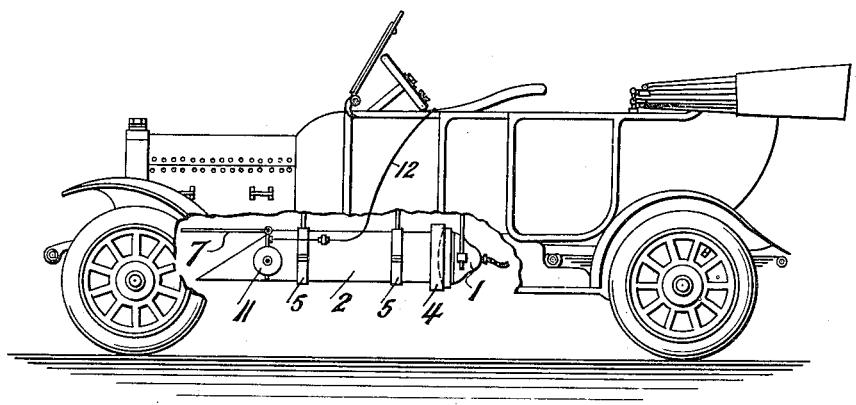
Figure 1 is a side elevation of a motor-driven road vehicle, a portion being broken away to show a lamp fitted according to this invention.
Figure 3:
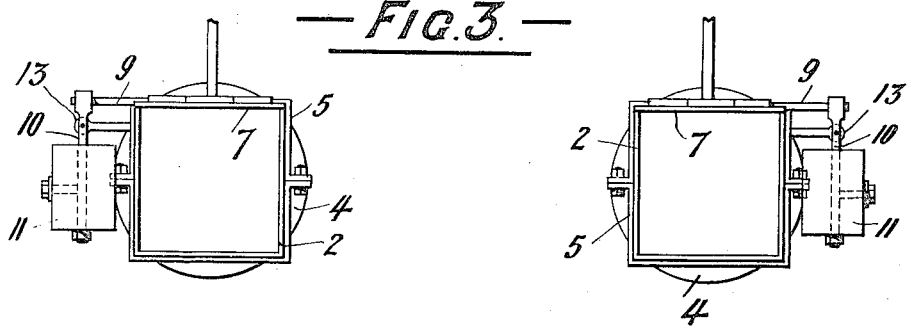
Fig. 3 shows in front elevation a pair of such light directing and controlling tubes as located and carried beneath the chassis of the car shown at Fig. 1.

In order to automatically cut off or regulate the light proceeding from the tube when the vehicle is going up hill, the front open end of the tube 2 is cut off at an angle and is fitted with a closure flap 7 hinged to the upper edge of the end of the tube at 8 Fig. 2, and the hinged pin 9 Fig. 3 which is fixed to the flap 7 has fixed to its extending end a depending arm 10 which carries a counterweight 11, which, when the car is traveling upon a horizontal road, maintains the flap 7 in the open position shown in full lines at Figs. 1 and 2. When however the car commences to ascend an incline, the flap 7 will be closed in proportion to the gradient up which the car is traveling.

By this arrangement the car, when traveling up hill, will not have the light rays of the lamp directed upwardly as usual, and therefore the lamps as so projected will not serve as signals to hostile aircraft.

It is generally preferred to provide the apparatus with means whereby the position of the flap 7 can be regulated mechanically by the driver of the car from his position therein, and to this end each apparatus is fitted with a wire connected to the depending arm 10 extending to within reach of the driver, and it is preferred to employ a Bowden wire connection, that is a non-compressible flexible tube 12 having an abutment 13 carried from the tube 2, while the operating wire 14 passes through the tube 12 and is connected to the arm 10.

What I claim as my invention and desire to secure by Letters Patent is:—

1. In lamps for motor road vehicles; the combination of a relatively long open-ended tube, means for supporting said tube with its axis horizontal from the vehicle, a lamp located at the rear end of said tube through which latter the rays of light therefrom pass, means for supporting said lamp, a flap hinged to the upper edge of the forward open end of said tube and adapted to be capable of closing said open end, an arm pendent from said flap at about the axis thereof, and a counterweight fixed on said pendent arm to normally hold said flap horizontal and maintain the forward end of said tube open and calculated to close the open forward end of said tube automatically by the adjustment of said flap about its hinge in accordance with the gradient up which the vehicle travels.

2. In lamps for motor road vehicles; the combination of a relatively long open-ended tube, means for supporting said tube with its axis horizontal from the vehicle, a lamp located at the rear end of said tube through which latter the rays of light therefrom pass, means for supporting said lamp, a flap hinged to the upper edge of the forward open end of said tube and adapted to be capable of closing said open end, an arm pendent from said flap at about the axis thereof, a counterweight fixed on said pendent arm to normally hold said flap horizontal and maintain the forward end of said tube open and calculated to close the open forward end of said tube automatically by the adjustment of said flap about its hinge in accordance with the gradient up which the vehicle travels, and means operable by the driver of the vehicle to mechanically move said flap about its hinge to control the open end of said tube at the option of the driver.

3. In lamps for motor road vehicles; the combination of a relatively long open-ended tube rectangular in cross section, means for supporting said tube with its axis horizontal beneath the body of the vehicle, a flanged enlargement at the rear open end of said tube, a lamp the lens of which enters said rear flanged enlargement of said tube, means for supporting said lamp, the forward open end of said tube having its end cut off at an angle inclined rearwardly, a flap hinged to the upper edge of the forward end of said tube, a pendent arm extending from the pivotal axis of said flap, a counterweight on said arm to control the position of said flap relatively to the open end of said tube, and a flexible connection extending from said pendent arm to within reach of the operator to mechanically regulate the position of said flap at the will of the operator substantially as set forth.

In witness whereof I have hereunto set my hand in the presence of two witnesses.

EDWARD LYCETT GREEN.

Witnesses:
A. E. HINCHLEY,
D. H. BOUSALL.